United States Patent [19]

Wagener

[11] 3,748,481

[45] July 24, 1973

[54] OPTICALLY COUPLED SOLID STATE RELAY

[75] Inventor: Paul W. Wagener, Depew, N.Y.

[73] Assignee: Westinghouse Electric Corporation, Pittsburgh, Pa.

[22] Filed: May 8, 1972

[21] Appl. No.: 251,307

[52] U.S. Cl. .............................. 250/214 R, 307/311

[51] Int. Cl. .............................. H01j 39/12

[58] Field of Search .................... 307/311; 250/208, 250/214, 217 SI, 206; 315/149, 156; 323/21, 22

[56] References Cited

UNITED STATES PATENTS

| | | | |
|---|---|---|---|
| 3,421,008 | 1/1969 | Shaw | 250/214 |
| 3,421,005 | 1/1969 | Baker | 307/311 |
| 3,483,429 | 12/1969 | Engel | 315/156 |
| 3,526,791 | 9/1970 | Codichini | 307/311 |

*Primary Examiner*—James W. Lawrence
*Assistant Examiner*—D. C. Nelms
*Attorney*—F. H. Henson and J. J. Wood et al.

[57] ABSTRACT

An optically coupled A.C. solid state relay is disclosed. A triac is serially connected with a load to be energized, the series combination being connected in parallel with an A.C. voltage source. A phototransistor is positioned to receive a signal of radiant energy when the load is to be energized. A first transistor is connected in a current path with the phototransistor, and with its common terminal clamped at a fixed potential. A second transistor is interposed between, and coupled to, the gate of the triac and to the phototransistor. A unidirectional conductor is connected to one main terminal of the triac and is coupled to the phototransistor and th first transistor. A voltage divider is connected to the fixed potential and to the other main terminal of the triac, the divided voltage portion being applied as a biasing potential to te first transistor. When radiant energy falls on the phototransistor, gating current flow through the second transistor and the phototransistor and then through either the first transistor or the unidirectional conductor so that the triac conducts in both directions.

5 Claims, 1 Drawing Figure

PATENTED JUL 24 1973
3,748,481
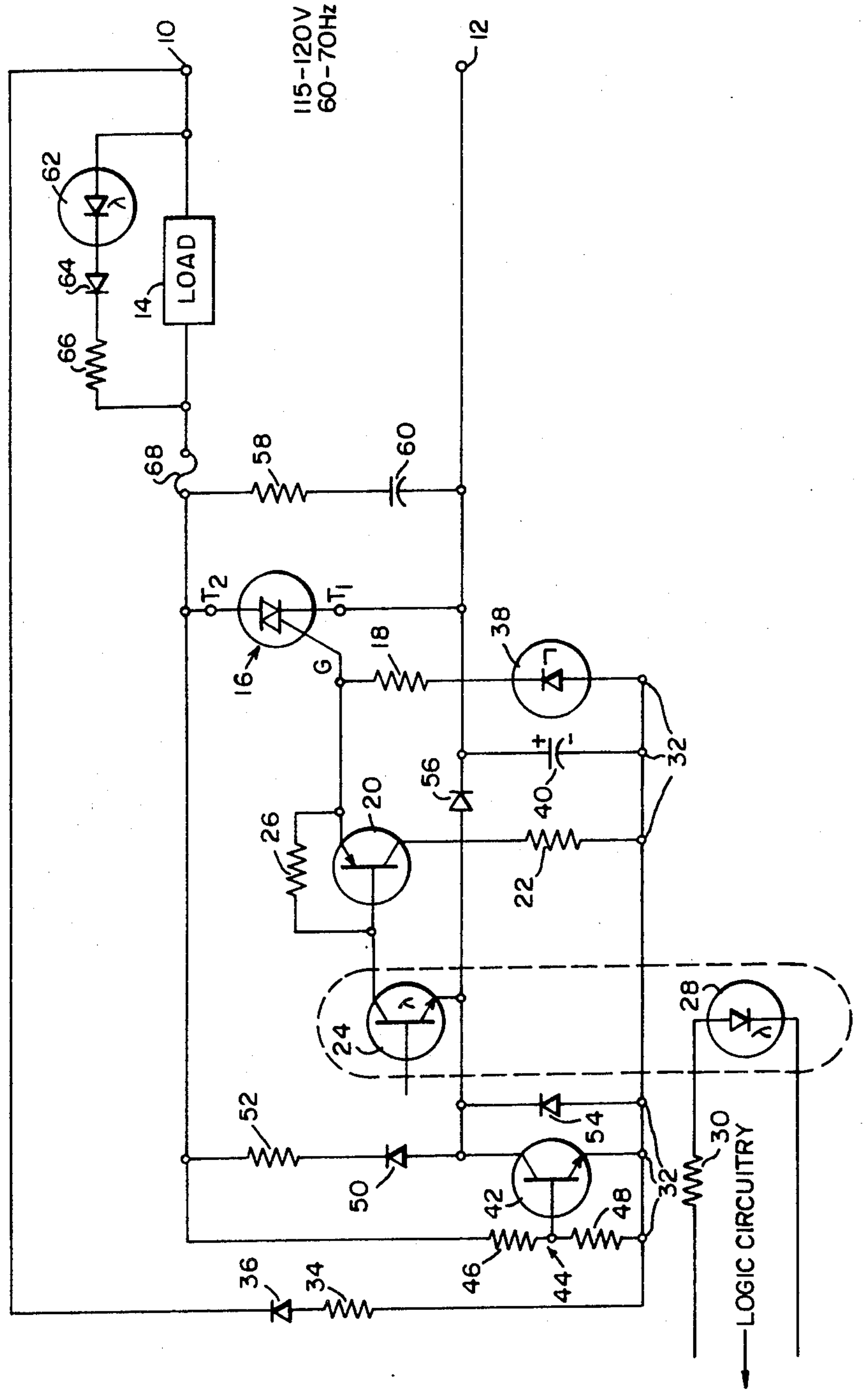

OPTICALLY COUPLED SOLID STATE RELAY

CROSS REFERENCE TO RELATED PATENT APPLICATION

See copending application for Optically Coupled Circuit Interface, Ser. No. 250,941 filed in the names of Andras I. Szabo and Tamas I. Pattantyas-Abraham on May 8, 1972 and assigned to the same assignee as the instant application.

BACKGROUND OF THE INVENTION

1. Field of the Invention

This invention relates to optically coupled A.C. solid state relays.

2. Description of the Prior Art

It is broadly known to provide solid state relays (SSRs) utilizing opto-electronic isolation or transformer coupling between input and output. Opto-electronic isolation in particular provides excellent voltage isolation, is compatible with digital logic circuitry, and provides a low coupling capacitance between input and output.

SUMMARY OF THE INVENTION

The instant invention provides an optically coupled A.C. solid state relay in which bi-directional triode thyristor means comprising first and second main terminals and a gate, is connected serially with a load to be energized, the serial combination being in parallel with an A.C. voltage source. Phototransistor means are positioned to receive a signal of radiant energy when the load is to be energized. A first transistor having first, second and common terminals is connected in a current path with the phototransistor means, the common terminal being clamped at a fixed potential. A second transistor is interposed between and coupled to the gate and the phototransistor means respectively. Unidirectional conducting means, connected at one end to the second main terminal is coupled to the phototransistor means and to the second terminal of the first transistor. Voltage dividing means are connected to the fixed potential and to the second main terminal, the divided portion being connected to the first terminal of the first transistor, whereby when radiant energy falls on the phototransistor means, the bi-directional triode thyristor means conducts in both directions.

BRIEF DESCRIPTION OF THE DRAWING

The single FIGURE is an electrical schematic showing the optically coupled A.C. solid state relay in accordance with the invention.

DESCRIPTION OF PREFERRED EMBODIMENT

Referring now to the figure, terminals 10, 12 are connected to a source of alternating current, such as 115–120V, 60–70 Hz. A load 14 to be energized is connected at one end to terminal 10, the other end being connected to main terminal T2 of a bi-directional triode thyristor means or triac indicate generally at 16. The triac also includes main terminal T1 and gate G. The main terminal T1 is connected to source terminal 12. A resistor 18 is connected between the gate G and the main terminal T1.

A transistor 20, has its emitter connected to the gate G, and its collector connected in series with a resistor 22. A phototransistor identified at 24, has its collector connected to the base of transistor 20. A resistor 26 also is connected between the emitter of transistor 20 and the collector of the phototransistor 24.

The phototransistor 24 is positioned in proximity to a light emitting diode 28 which is connected to logic circuitry through a series resistor 30.

A source of clamped potential, i.e., −18v is provided at node 32, by means of a half wave rectifier comprising resistor 34 and diode 36, cooperating with a zener or avalanche diode 38 and an electrolytic capacitor 40. The serially connected resistor-diode combination 34,36 is connected to node 32 and to terminal 10 respectively as shown. The zener diode 38 has its anode connected to node 32 and its cathode connected to triac main terminal T1. The electrolytic capacitor 40, with the polarity indicated, is connected in parallel with the zener diode 38.

A transistor indicated at 42 has its emitter connected to node 32 and its collector connected to the emitter of the phototransistor 24. A voltage divider indicated generally at 44, comprising resistors 46, and 48 is connected to the base of transistor 42. As will be observed, the voltage divider 44 is connected across node 32 and main terminal T2. A diode 50 and a serially connected resistor 52 is connected between the emitter of phototransistor 24 and triac main terminal T2.

Diode 54 has its anode connected to node 32 and its cathode connected to the collector of transistor 42. A diode 56 has its anode connected to the collector of transistor 42 and its cathode connected to main terminal T1.

Completing the description of the circuit, a resistor 58 and a serially connected capacitor 60 is connected in parallel with the triac 16. A serially connected combination of light emitting diode 62, diode 64 and resistor 66 may be connected in parallel across the load 14 to give visual indication when the load is energized. The circuit may be protected by a fuse 68.

It will be noted that the base of the phototransistor 24 is floating free. In some applications it may be advantageous to connect a capacitor between the base and emitter of the phototransistor 24 although this is not necessary in the practice of this invention.

OPERATION

Under quiescent conditions when the load is deenergized the following conditions prevail.

The diode 36, zener diode 38, electrolytic capacitor 40 and resistor 34 provide a filtered half wave D.C. supply voltage of approximately −18v. Using conventional current notation, when terminal 12 is instantaneously +, the circuit may be traced, terminal 12, through zener diode 38, resistor 34, diode 36 to terminal 10 which is then instantaneously −. The electrolytic capacitor 38 charges to 18v with the polarity shown. When the terminal 10 is instantaneously +, the diode 36 blocks conduction.

It should be noted that there is a slight current leakage through the load 14 even though the logic circuitry commands deenergization. These currents paths are through resistor-capacitor 58,60, zener diode 38, voltage divider 44, diode 54 and the diode-resistor combination 50,52.

The transistors 42 and 20 are OFF. The phototransistor 24 and the triac 16 are non-conducting.

When it is desired to energize the load 14, the logic circuitry sends a current signal through the light emitting diode 28 causing it to emit light which strikes the base-emitter junction of the phototransistor 24. The radiant energy develops charges in the emitter-base circuit. When the terminal 10 is instantaneously + and the voltage at the main terminal T2 reaches about +12 volts, this places about 30 volts across the resistors 46,48 since the lower end of resistor 48 is clamped at −18v. The voltage dividing action provided by 46,48, develops about +.6v at the base of transistor 42 and it conducts, pulling its collector down to about −18v. The emitter of the phototransistor 24 is now at −18v. The transistor 20 in the non-conducting state has its emitter about 0 volts and the base about 0 volts. The gate G now develops current in a path which may be traced: gate G, emitter-base of transistor 20 through the collector-emitter junction of the phototransistor 24 and through the collector-emitter of transistor 42. The collector current through resistor 22 develops gating current. The triac 16 turns on heavily and becomes a virtual short so that the full line voltage is applied to the load 14.

The turning on of the triac 16 quickly reduces the voltage across 46,48 thereby turning off transistor 42 and hence transisor 20 (there is still sufficient number of carriers in the phototransistor so that it is in a "floating" state ready to fully conduct again).

When the A.C. supply voltage goes through zero, the triac turns OFF. The polarity of the terminals is reversed and terminal 12 now goes +. The terminal T2 of the triac develops a negative potential with respect to terminal T1. Gating current flows through the emitter-base of transistor 20 (turning it ON), collector-emitter of the phototransistor 24 through diode 50, resistor 52 to terminal 10. The gating current developed through resistor 22 turns on the triac 16 again which conducts heavily (i.e., is a virtual short) so that the supply voltage at 10–12 is applied to the load. The gating current is again interrupted and transistor 20 turns OFF. The triac 16 conducts until the alternating voltage goes through zero at which time it turns OFF. The process is repetitive—when approximately 30v appear across resistors 46,48, transistor 42 turns on etc. As a result of the turning ON and OFF of the triac the load 14 does not receive a perfect full sine wave of voltage and current; however, this distortion results in loss of only a few electrical degrees. So that the wave is substantially sinusoidal, and for industrial control applications this is of no consequence.

The diode 50 is used to provide blocking in one direction. Diodes 54 and 56 provide blocking and clamping functions. The electrolytic capacitor 40 stabilizes the voltage across the zener diode 38. The resistor-capacitor 58,60 series combination minimizes the effect of the voltage changes across the triac 16. The light emitting diode 62 blocking diode 64 and resistor 66 provide a visual signal when the load is energized.

I claim:

1. An optically coupled A.C. solid state relay comprising:

bi-directional triode thyristor means comprising first and second main terminals and a gate, said bi-directional triode thyristor means being serially connected with a load to be energized, the serial combination being in parallel with an A.C. voltage source;

phototransistor means positioned to receive a signal of radiant energy when said load is to be energized;

a first transistor having first, second and common terminals, said second terminal being connected in a current path with said phototransistor means, said common terminal being clamped at a fixed potential;

a second transistor interposed between and coupled to said gate and said phototransistor means respectively;

unidirectional conducting means, connected at one end to said second main terminal, is coupled to said phototransistor means and to said second terminal of said first transistor; and voltage dividing means connected to said fixed potential and to said second main terminal, the divided portion thereof being connected to said first terminal of said first transistor, whereby when radiant energy falls on said phototransistor means said bi-directional triode thyristor means conducts in both directions.

2. An optically coupled A.C. solid state relay comprising:

bi-directional triode thyristor means comprising first and second main terminals and a gate, said bi-directional triode thyristor means being serially connected with a load to be energized, the serial combination being in parallel with an A.C. voltage source;

photodiode means arranged to receive a logic current signal when said load is to be energized;

phototransistor means in proximity to said photodiode means to receive the radiant energy emitted when said photodiode means is conducting;

a source of fixed potential;

a first transistor having first, second, and common terminals, said second terminal being connected with said phototransistor means, said common terminal being connected to said source of fixed potential;

a second transistor interposed between and coupled to said gate and phototransistor means respectively;

unidirectional conducting means;

resistance means, said unidirectional conducting means and said resistance means being connected in series, the latter serial combination being coupled to said phototransistor means and to said second terminal of said first transistor; and voltage dividing means connected to said source of fixed potential and to said second main terminal, the divided voltage portion thereof being connected to said first transistor;

whereby when said phototransistor receives radiant energy said bi-directional triode thyristor means conducts in both directions to energize said load.

3. An optically coupled A.C. solid state relay according to claim 2 comprising:

a resistor and a capacitor connected in series, the latter serial combination being connected in parallel with said bi-directional triode thyristor means.

4. An optically coupled A.C. solid state relay according to claim 2 wherein said source of fixed potential comprises, a zener diode, and electrolytic capacitor, a diode and a resistor the electrolytic capacitor being in parallel with said zener diode, the parallel combination being connected at one side to said first main terminal, the resistor and diode being connected in series, the serial combination being connected respectively to one terminal of said A.C. source and to said parallel combination of electrolytic capacitor and zener diode.

5. An optically coupled A.C. solid state relay according to claim 2 comprising first and second diodes, said first diode being connected in parallel with the first and common terminals of said first transistor, said second diode being connected between said first terminal of said first transistor and said first main terminal.

* * * * *